United States Patent
Lang et al.

(10) Patent No.: US 10,171,553 B2
(45) Date of Patent: Jan. 1, 2019

(54) METHOD FOR MONITORING AND CONTROLLING AN ACCESS CONTROL SYSTEM

(71) Applicant: SKIDATA AG, Grodig/Salzburg (AT)

(72) Inventors: Christian Lang, Haigermoos (AT); Jorge Clemente, Puch bei Hallein (AT)

(73) Assignee: SKIDATA AG, Grödig/Salzburg (AT)

( * ) Notice: Subject to any disclaimer, the term of this patent is extended or adjusted under 35 U.S.C. 154(b) by 318 days.

(21) Appl. No.: 15/071,473

(22) Filed: Mar. 16, 2016

(65) Prior Publication Data
US 2016/0285950 A1    Sep. 29, 2016

(30) Foreign Application Priority Data

Mar. 26, 2015  (EP) .................................... 15161092

(51) Int. Cl.
*G06F 15/16* (2006.01)
*H04L 29/08* (2006.01)
(Continued)

(52) U.S. Cl.
CPC .......... *H04L 67/025* (2013.01); *G02B 27/017* (2013.01); *G06F 1/163* (2013.01);
(Continued)

(58) Field of Classification Search
CPC ........ H04L 67/025; H04W 4/50; H04W 4/80; H04W 4/001; H04W 4/008; H04W 12/08; G02B 27/017; G02B 2027/014; G02B 2027/0178; G06F 3/013; G07C 9/00079; G07C 9/00103; G07C 9/02; H04B 1/385
(Continued)

(56) References Cited

U.S. PATENT DOCUMENTS

2002/0046368 A1*  4/2002  Friedrich ............. G05B 19/409
                                                        714/45
2013/0069985 A1     3/2013  Wong et al.
(Continued)

FOREIGN PATENT DOCUMENTS

WO    2014/198945 A1   12/2014

OTHER PUBLICATIONS

European Search Report Corresponding to 15161092.0 dated Sep. 18, 2015.

*Primary Examiner* — Jonathan A Bui
(74) *Attorney, Agent, or Firm* — Davis & Bujold PLLC; Michael J. Bujold

(57) ABSTRACT

A method of monitoring and controlling an access control system (12) comprising a server (18) and an access control device (22) connected to the server (16) for data communication. Data goggles (1) monitor and control the access control system. The data goggles are connected wirelessly to the server (16) and the access control device (22) for data communication and receive data in real time from the server (16) and/or the access control device (22), which enable monitoring of the access control system (12). The data is displayed to the user of the data goggles (1) by a display device (10). The access control system (12) is controlled by commands which are inputted by the data goggles (1) and transmitted to the server (16) and/or the access control device (22). The control commands are input either by voice control, by gesture control, by a touchpad or by eye tracking.

10 Claims, 2 Drawing Sheets

Figure 1:
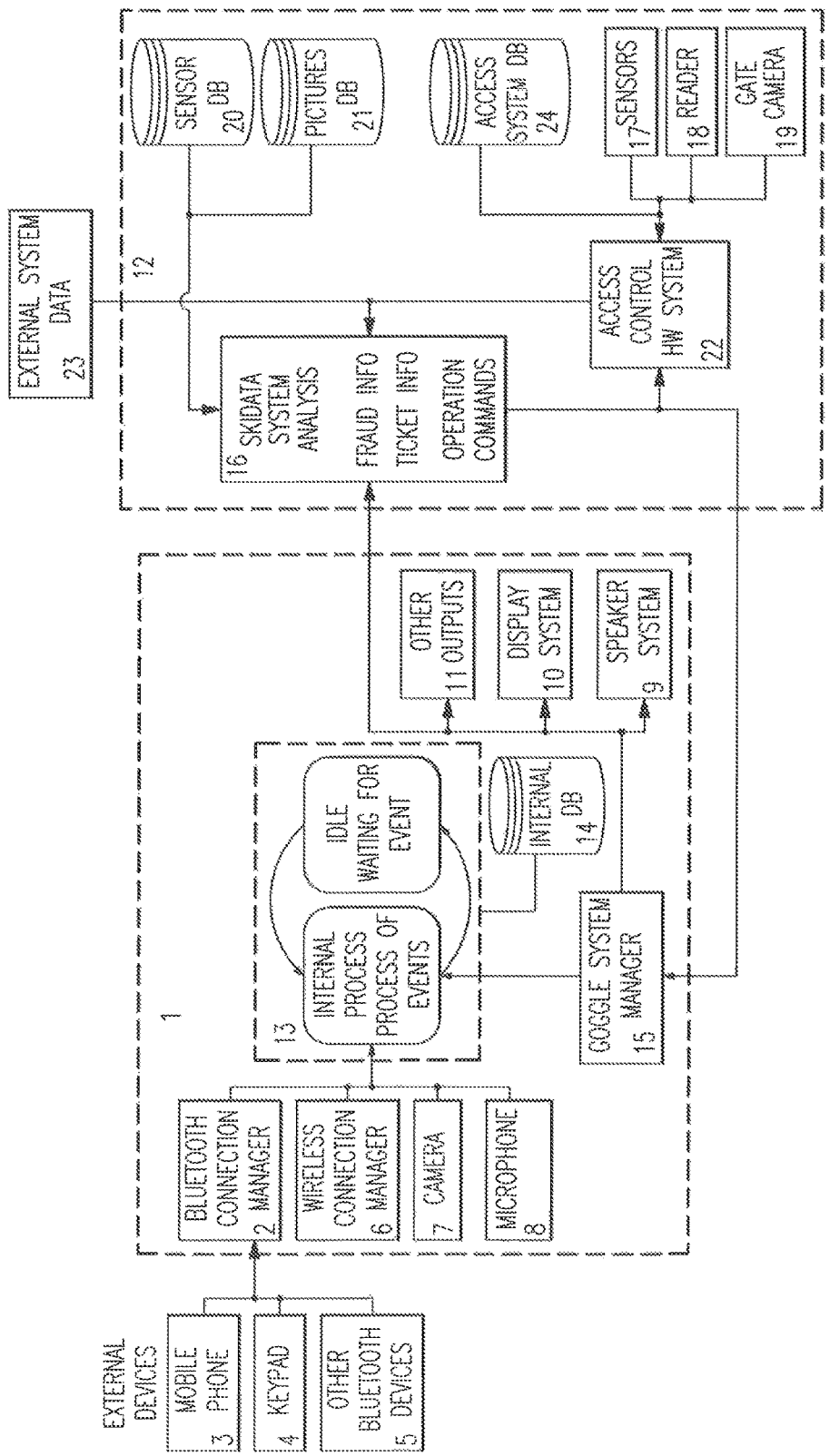

(51) Int. Cl.
*H04W 4/50* (2018.01)
*H04W 4/80* (2018.01)
*G06F 1/16* (2006.01)
*G07C 9/00* (2006.01)
*G07C 9/02* (2006.01)
*H04B 1/3827* (2015.01)
*H04W 12/08* (2009.01)
*G02B 27/01* (2006.01)
*G06F 3/01* (2006.01)

(52) U.S. Cl.
CPC ......... *G06F 3/013* (2013.01); *G07C 9/00079* (2013.01); *G07C 9/00103* (2013.01); *G07C 9/02* (2013.01); *H04B 1/385* (2013.01); *H04W 4/50* (2018.02); *H04W 4/80* (2018.02); *H04W 12/08* (2013.01); *G02B 2027/014* (2013.01); *G02B 2027/0178* (2013.01)

(58) Field of Classification Search
USPC .......................................................... 709/205
See application file for complete search history.

(56) References Cited

U.S. PATENT DOCUMENTS

| | | | |
|---|---|---|---|
| 2013/0141313 A1 | 6/2013 | Zhou et al. | |
| 2013/0278631 A1* | 10/2013 | Border | G02B 27/017 345/633 |
| 2014/0125558 A1 | 5/2014 | Miyajima et al. | |
| 2015/0341717 A1* | 11/2015 | Song | H04R 1/08 381/110 |
| 2016/0092665 A1* | 3/2016 | Cowan | G06F 21/35 726/9 |
| 2016/0098878 A1* | 4/2016 | Cabouli | G06F 21/32 340/5.52 |
| 2016/0328021 A1* | 11/2016 | Lee | G06F 3/011 |

* cited by examiner

METHOD FOR MONITORING AND CONTROLLING AN ACCESS CONTROL SYSTEM

The present invention relates to a method for monitoring and controlling an access control system according to the preamble of patent claim 1. Further the invention relates to an apparatus for executing the method.

Data goggles are known from the prior art. These comprise a spectacle frame which optionally comprises spectacle glasses as well as components integrated in the frame, in particular interfaces for wireless communication, a processor, storage means, a camera, a microphone, a battery, a loudspeaker and a display device which is designed as a head-up display and projects the image via a glass prism or in the event that spectacle glasses are provided, onto one or both spectacle glasses in the field of view of the user.

Furthermore, data goggles can have a USB connection and a touchpad, where the display device can have a so-called eye-tracking functionality.

Access control systems usually comprise at least one server and at least one access control device which can be connected to the server for the purpose of data communication and usually comprises a microprocessor and storage means, which access control device records access authorizations and in the event of a valid access authorization, actuates a locking member in the opening sense in order to allow access. ID-based access control systems use the ID of a customer medium, where the ID of the customer medium is read out by access control devices of the access control system and is transmitted to the at least one server, which by means of the ID allows or refuses access via she ID-transmitting access control device. The customer medium can, for example, be designed as an RFID tag, RFID card or as a paper ticket with machine-readable information.

Compared to the so-called medium-based access control systems in which access is allowed or refused by reference to information stored on a customer medium without contacting a central server, ID-based access control systems have the advantage that a high flexibility and scaling is ensured. An ID of a customer medium can be assigned to several types of access authorizations, for example for different regions and different times and different operators, which is particularly advantageous in ski areas.

For the case where an access control device or the server are offline, the recorded access authorizations are analyzed with regard to validity according to plausibility parameters in the access control device and access is allowed if predefined parameters have predefined values or lie within a predefined value range. For example, for the case where the access authorization is a day pass and the validity date corresponds to the actual date, access is allowed. The recorded data of the access authorization are stored intermediately for a subsequent evaluation in the access control device and loaded onto the server when remaking the online connection.

Furthermore a positive/negative list or a so-called whitelist can be stored in a storage medium or in a database of the at least one access control device, by means of which the validity state of an access authorization is determined by means of the ID of the access authorization which is updated by at least one server at regular intervals or by a corresponding control of the access control device. In this way, if an access control device or a server is offline, access can be allowed if the access authorization is designated as valid by reference to the positive/negative list or the whitelist.

For the monitoring and control of access control systems, staff must operate at least one computer and monitor the display of at least one display apparatus. For the case where staff are directly looking after customers at the same time, which can be the case, for example, at a counter, the continuous monitoring and control of the access control proves to be difficult.

It is the object of the present invention to provide a method for monitoring and controlling an access control system comprising at least one server and at least one access control device which can be connected to the at least one server for the purpose of data communication. This object is solved by the features of patent claim 1. Furthermore, an apparatus for carrying out the method is to be provided, which is the subject matter of patent claim 9. Further inventive embodiments and advantages are obtained from the subclaims.

Accordingly, a method for monitoring and controlling an access control system is proposed, comprising at least one server and at least one access control device which can be connected to the at least one server for the purpose of data communication, within the framework of which data goggles are used for monitoring and controlling the access control system, which data goggles are connected wirelessly to the at least one server of the access control system and the at least one access control device for the purpose of data communication and receive data in real time from the at least one server and/or the at least one access control device, which enable the monitoring of the access control system, wherein these data can be displayed to the user of the data goggles by means of a display device of the data goggles. The access control system is preferably designed as an ID-based, access control system.

Here the user can select between different views and control the access control system, wherein the corresponding commands for selecting the views which are displayed by means of the display device and the control commands to the at least one server of the access control system and/or to the at least one access control device can be input by means of voice control via the integrated microphone, by means of gesture control by means of the integrated camera, by means of actuation of the integrated touchpad or by means of eye tracking. Within the framework of the eye tracking, for example a virtual keypad can be displayed where one key of the keypad is selected when the view of the user is fixed on this key for a predefined time. In the case of a displayed selection of commands or menu points, a command or a menu point is selected when the view of the user is fixed on a command or a menu point for a predefined time.

The control of the access control system can be initiated by the user or carried out as a response to notifications or requests of the at least one server and/or the at least one access control device of the access control system which are displayed to the user via the display device. For the case where the access control system transmits notifications via the at least one server and/or the at least, one access control device to the data goggles, which require an action by the user, these notifications and the available control commands are displayed directly to the user. Such notifications can be notifications about defined events or irregularities in the access control system, for example, about a blocked or defective access control device, about attempted fraud, vandalism or about the detection of invalid access authorizations.

According to a further development of the invention, an access control can be carried out by means of the data goggles, wherein for this purpose by means of the integrated camera access authorizations comprising a barcode or access authorizations based on RFID or Bluetooth low-energy standards can be read out, where in particular in the offline case, i.e. when there is no connection to the server, the evaluation of the validity in the data goggles is made by means of barcode reading software or software for evaluating RFID or Bluetooth low energy (BLE) access authorizations and a positive/negative list stored in a storage medium of the data goggles which is updated by at least one server at regular intervals or by a corresponding control by the user. In the online case, i.e. when there is a connection to at least one server, the recording of the barcode or the read-out information of the RFID or Bluetooth Low-Energy (BLE) access authorizations are transmitted to the at least one server together with an ID of the corresponding access control device, where access is allowed or refused by means of the evaluation made in the server with regard to the validity of the access authorization. Access can be granted by means of an access control device which can be controlled by the data goggles or manually, e.g. within the framework of a random sample.

Similarly to the procedure for access control, in the area of an access control, system the access authorizations of persons can be checked, e.g. within the framework of random samples.

Furthermore, in an offline case the recorded access authorizations can be analyzed with regard to validity according to plausibility parameters in the data goggles and access is allowed if predefined parameters have predefined values or lie within a predefined value range. For example, for the case where the access authorization is a day pass and the validity date corresponds to the actual date, access is allowed. The recorded data of the access authorization are stored intermediately for a subsequent evaluation in the access control device and loaded onto the server when remaking the online connection.

The apparatus for carrying out the method according to the invention is accordingly designed as data goggles, comprising a processor, storage means, a Bluetooth module, a digital camera, a microphone, a loudspeaker, a display device and a WLAN module where a Bluetooth low-energy module is integrated in the data goggles for reading out access authorizations based on Bluetooth low energy standards and/or an HP or UHF RFID reading device.

Figure 2:
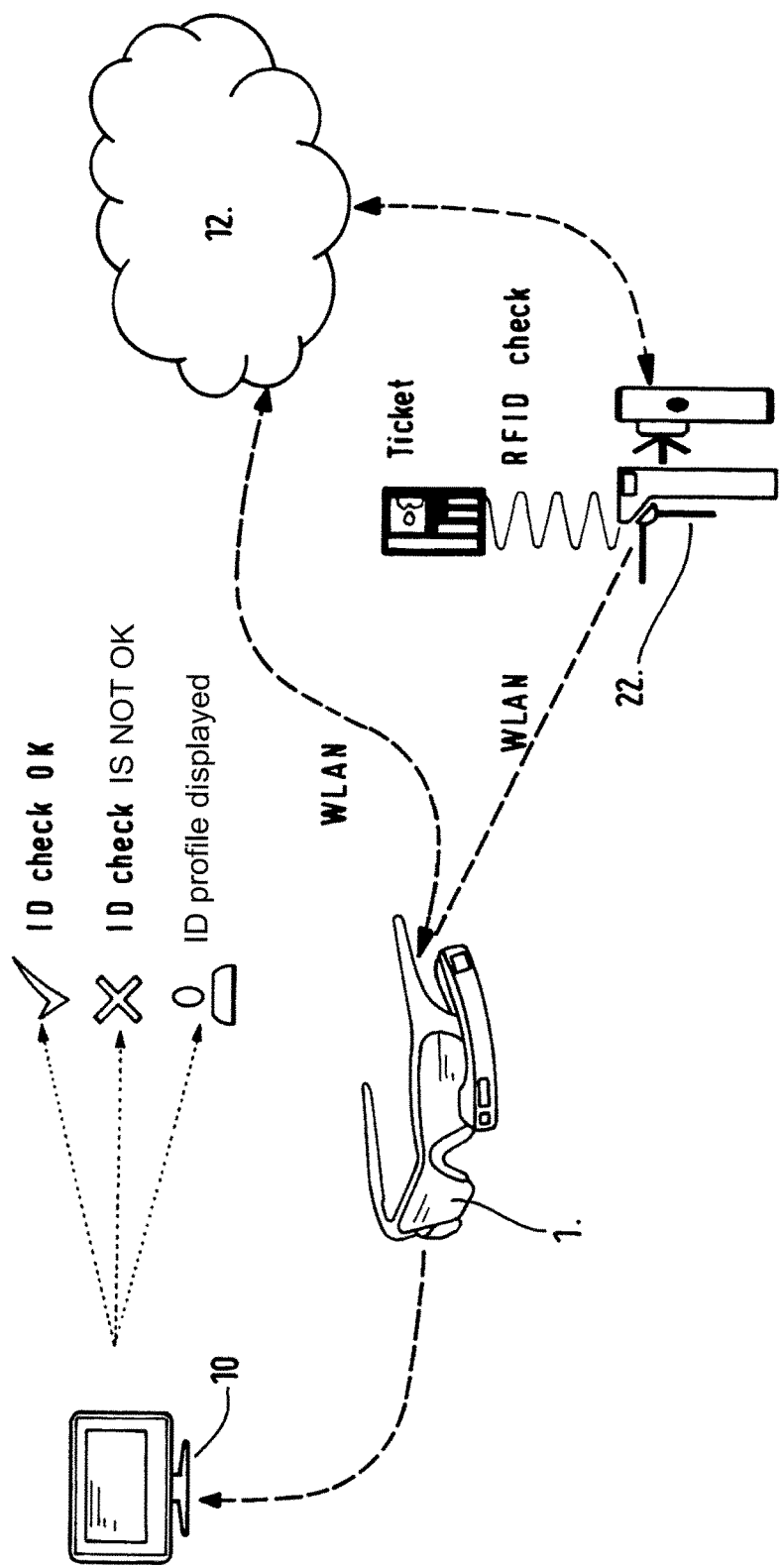

The invention is described in detail hereinafter as an example with reference to the appended figures. In the figures:

FIG. 1: shows a schematic view of the most important components of data goggles and the connection of the data goggles to an access control system; and FIG. 2: shows a view of the use of data goggles for monitoring the results of the access control in an access control system.

According to the invention and with reference to FIG. 1, data goggles 1 comprise a processor 13 and storage means 14 and can be connected by means of a Bluetooth module 2 to external devices for the purpose of data communication such as, for example, to a mobile telephone 3, a keypad 4 and further equipment 5.

Preferably the data goggles 1 comprise a digital camera 7 and a microphone 8, where a loudspeaker 9, a display device 10 or further suitable devices 11 can be provided for data output. The data goggles further comprise an operating system module 15. The access control system 12 in the example shown comprises a server 16 as well as databases 20, 21 and at least one access control device 22 which can be connected to sensors 17, reading devices 18 for access authorizations and cameras 19. In the example shown the at least one access control device 22 is connected to a local database 24 s on which a positive/negative list or a so-called whitelist is stored, by means of which particularly in the offline case, the validity state of an access authorization is determined by means of the ID of the access authorization.

The server 16 of the access control system 12 is preferably connected to the data goggles 1 via a WLAN module 6 of the data goggles 1 for the purpose of data communication, where the data goggles 1 can also be connected via the at least one access control device 22 or the at least one server 16 to other, external systems 23, for example, to databases of payment systems preferably via WLAN for the purpose of data communication, Furthermore the data goggles 1 are connected via WLAN to the at least one access control device 22, thereby ensuring that even in the event of a failure of the connection to the at least one server 16, the at least one access control device 22 can be monitored and controlled by means of the data goggles 1. The wireless connection between the data goggles 1 and the server 16 and/or the at least one access control device 22 can also be accomplished by means of GSM standards where in this case, the data goggles 1 have a corresponding module.

The commands for selection of the views in the display device 10 of the data goggles 1 and the control commands to the at least one server 16 of the access control system 12 and/or to the at least one access control device 22 can be input by means of voice control via the integrated microphone 8, by means of gesture control by means of the integrated camera 7 and corresponding software for evaluating the recorded gestures, by means of actuation of the integrated touchpad or by means of eye-tracking.

Commands for selection of the views in the display device 10 of the data goggles 1 and the control commands to the at least one server 16 of the access control system 12 and/or to the at least one access control device 22 can also be input by means of input devices connected to the data goggles 1 by means of the Bluetooth module 2 or WLAN, e.g. via a keypad 4 or a mobile telephone 3, where in this case the control commands are transmitted via the data goggles 1 to the at least one server 16 and/or to the at least one access control device 22 of the access control system 12. Furthermore, the commands for selection of the views in the display device 10 of the data goggles 1 and the control commands to the at least one server 16 of the access control system 12 and/or to the at least one access control device 22 can be input by means of a remote control which is worn like a watch on the wrist of the user of the data goggles 1 and is connected in a wireless manner to the data goggles 1, preferably via WLAN or Bluetooth. For example, the remote control can have only four keys for scrolling between menu entries which are display by means of the display device 10 of the data goggles 1, i.e. one each for one of the directions "up, down, left and right". Another fifth key is provided in this case for selecting or clicking a control command or a menu entry.

According to the invent ion and with reference to FIG. 2, a user can monitor an access control system 12 by means of the data goggles 1, where the corresponding information is displayed by means of the display device 10 of the data goggles 1. In the example shown in FIG. 2, the results of the access control performed online or offline in am access control device 22 of an access control system 12 for ski lifts are displayed to the user of the data goggles 1. For example, the user can monitor the access control device 22 via a WLAN connection by means of the data delivered directly from the server 16 of the access control system 12 or from the access control device 22 in order to determine whether the currently recorded access authorizations are valid or not, where the access authorizations can be of any type, for example Bluetooth low-energy, RFID or barcode access authorizations.

For the case where an access control device 22 or the at least one server 16 are offline, the recorded access authorizations are analyzed with regard to validity according to plausibility parameters in the access control device 22 and access is allowed if predefined parameters have predefined values or lie within a predefined value range. The recorded data of the access authorizations are stored intermediately for a subsequent evaluation in the access control device 22 said loaded onto the server 16 when remaking the online connection.

Furthermore a positive/negative list or a so-called whitelist can be stored in a storage medium or in a database 24 of the at least one access control device 22, by means of which the validity state of an access authorization is determined by means of the ID of the access authorization which is updated by at least one server at regular intervals or by a corresponding control of the access control device 22. In this way, if an access control device 22 or a server 16 is offline, access can be allowed if the access authorization is designated as valid by reference to the positive/negative list or the whitelist. When the online connection is remade, the recorded data of the access authorizations are transmitted to the at least one server 16.

According to the invention, by corresponding control by means of the display device 10 of the data goggles 1, the user can view the profile assigned to the respective access authorization recorded by means of an access control device 22 during the access control. In the event that the access control system 12 has a plurality of access control devices 22, by inputting a suitable command the user of the data goggles 1 can determine which access control device 22 should specifically be monitored. Furthermore, it is possible that only in the case of the occurrence of defined events, for example, in the case of an invalid access authorization read out by an access control device 22, the user is informed of these events by means of the display device 10 of the data goggles 1 and optionally by an acoustic signal.

For example by means of the display device 10 of the data goggles 1 the user can be informed whether problems have occurred during the online or offline detection of a Bluetooth low energy, an RFID, a barcode or another access authorization executed according to the prior art via an access control device 22 of the access control system 12. According to the invention, the user of the data goggles 1 can control the access control system 12 and for example, in the event of an invalid access authorization, can manually grant access, view the profile associated with the respective access authorization, observe a live image by means of a camera 19 associated with the access control device via the display device 10 of the data goggles 1 and/or via the microphone 8 of the data goggles 1 and a loudspeaker device of the access control device 22 can give instructions to the person who possesses the access authorization. In the event that the access control device has a microphone, a bidirectional communication can be produced. The control commands can, for example, be input by means of voice control via the integrated microphone 8, by means of gesture control by means of the integrated camera 7, by means of actuation of the integrated touchpad or by means of eye tracking.

According to the invention software, for example, in the form of so-called apps can be installed in the data goggles 1. For example, software can be installed for reading out barcodes; in this case, by means of the camera 7 integrated in the data goggles 1, a barcode of an access authorization can be read out, where in the offline case (i.e. there is no connection to the server 16) the barcode is evaluated by reference to a positive/negative list or a whitelist which is stored in a storage medium 14 of the data goggles 1 and updated by the server 16 at regular intervals or by a corresponding control by the user, where by reference to the evaluation in the case of a valid access authorization an access control device 22 is actuated in the opening direction by means of the connection between the data goggles 1 and the access control device 22 or access is granted manually and upon remaking an online connection to the at least one server, the database of the access control system is updated with an ID number of the access authorization and the evaluation result. In the online case (i.e. there is a connection to the server 16, the information contained in the barcode and an ID of the of the corresponding access control device is transmitted preferably for evaluation to the server 16 of the access control system 12. By reference to the evaluation in the server 16 of the access control system 12, the corresponding access control device 22 is actuated in the opening direction or access is refused.

In the event that no barcode reading software is installed in the data goggles 1, it is identified by means of the camera that a barcode is located in the acquisition field of the camera 7 and then a photograph of the barcode is taken and transmitted to the server 16 of the access control system 12 together with an ID of the corresponding access control device 22 for evaluation. By reference to the evaluation in the server 16 of the access control system 12, the corresponding access control device 22 is actuated in the opening direction or access is refused. If no barcode reading software is installed in the data goggles 1 and the at least one server is offline, the recorded access authorizations in the data goggles 1 can be analyzed according to plausibility parameters with regard to validity and by means of the connection between the data goggles 1 and the respective access control device 22, access is allowed if predefined parameters have predefined values or lie within a predefined range of values.

Within the framework of a further embodiment of the invention, by means of a Bluetooth low-energy module of the data goggles 1, an access authorization can be read out by means of a Bluetooth low-energy (BLE) standard, where the read-out information is displayed by means of the display device 10 of the data goggles 1 and the information together with an ID of the corresponding access control device 22 is transmitted to the at least one server 16 of the access control system. The information transmitted to the server 16 is evaluated in the server 16, the access control system 12 being controlled by means of the result in order to allow access for the case of a valid access authorization. Alternatively, in particular in the offline case, i.e. when there is no connection to the server 16, the read-out access authorization can be evaluated by means of a positive/negative list or a whitelist which is stored in a storage mean 14 of the data goggles 1 and which is updated by the server 16 at regular intervals or by a corresponding control by the user of the data goggles 1, where by reference to the evaluation in the case of a valid access authorization a corresponding access control device 22 is actuated in the opening direction and upon remaking an online connection to the at least one server 16, the database of the access control system 12 is updated with an ID number of the access authorization and the evaluation result.

Within the framework of a further development, in particular when there is no connection to the at least one server 16, the read-out access authorization can be evaluated by means of the connection between the data goggles I and the access control device 22 by reference to a positive/negative list or a whitelist which is stored in a storage means of an access control device 22 of the access control, system and which is updated by the server 16 at regular intervals or by a corresponding control by the user.

According to the invention; an HF or UHF RFID reading device can be integrated in the data goggles 1, where an access authorization can be read out by means of the RFID reading device, where the read-out information is displayed by means of the display device 10 of the data goggles 1 and the information together with an ID of the corresponding access control device 22 is transmitted to the at least one server 16 of the access control system 12. The information transmitted to the server 16 is evaluated, in the server 16, where the access control system is controlled by means of the result, in order to allow access in the case of a valid access authorization. Alternatively in particular in the offline case, i.e. when there is no connection to the server, the read-out access authorization can be evaluated by means of a positive/negative list or a whitelist which is stored in the data goggles 1 and which is updated by the server at regular intervals or by a corresponding control by the user, where in the case of a valid access authorization a corresponding access control device 22 is actuated in the opening direction and upon remaking an online connection to the at least one server, the database of the access control system 12 is updated with an ID number of the access authorization and the evaluation result.

Within the framework of another embodiment of the invention, as part of the access control of Bluetooth low-energy, RFID, barcode or other access authorizations, a face recognition is carried out by means of the camera 7 integrated in the data goggles 1, wherein upon identifying the presence of a person in the acquisition field of the camera 7, the face of the person is recorded, and if a face recognition software is installed in the data goggles 1, a face recognition is performed by means of the face recognition software installed in the data goggles 1 and the recorded image of the person is compared with a facial image associated with the access authorization, which serves as a reference image, and access is allowed when the reference image agrees with the recorded image of the person and a valid access authorization is present.

If no face recognition software is installed in the data goggles 1, the recording is transmitted to the at least one server 16 for face recognition; in the server 16 the recorded image of the person is compared with a facial image associated with the access authorization, which serves as a reference image and which can be stored in a database 21, and access is allowed via the corresponding access control device 22 if the reference image agrees with the recorded image of the person and a valid access authorization is present.

Within the framework of a further development of the invention, in the case of access control by means of a camera associated with the respective access control device 22 of the access control system 12, facial views of the persons whose access authorization is to be evaluated are prepared, wherein these views are transmitted to the data goggles 1 and displayed at the same time with a facial image serving as reference image, associated with the recorded ID of the access authorization, by means of the display device of the data goggles 1 whereby the user of the data goggles 1 can allow access via the access control device 22 if the reference image agrees with the recorded image of the person and a valid access authorization is present.

Access control systems in the sense of the invention are, for example access control systems for ski areas, for trade fairs and sporting events as well as for covered car parks and parks where for the case of covered car parks and parks, the parking pillars and vehicle barriers serve as access control devices and are monitored. Furthermore, the operation of automatic pay machines of the access control system which are connected to the at least one server for data communication can also be monitored by means of the method according to the invention.

The invention claimed is:

1. A method for monitoring and controlling an access control system (12) having at least one server (16) and at least one access control device (22) which is connectable to the at least one server (16) for the purpose of data communication, the method comprising:
   positioning the at least one access control device in a location that facilitates monitoring and controlling the access of people to a controlled area;
   providing a user with data goggles (1) for monitoring and controlling the access control system;
   wirelessly connecting the data goggles to the at least one server (16) of the access control system (12) and the at least one access control device (22) for the purpose of data communication and receiving data in real time from at least one of the at least one server (16) and the at least one access control device (22), which enable the monitoring of the access control system (12);
   displaying the data to the user of the data goggles (1) with a display device (10) of the data goggles (1);
   controlling the access control system (12) with control commands which are input by the user into the data goggles (1) and transmitting the control commands from the data goggles to the at least one of the at least one server (16) and the at least one access control device (22);
   inputting the control commands by one of voice control via a microphone (8) integrated in the data goggles (1), gesture control by a camera (7) integrated in the data goggles (1), actuation of a touchpad integrated in the data goggles (1), and eye tracking; and
   actuating the at least one access control device based on the control commands input by the user into the data goggles to either allow or deny a person access to the controlled area.

2. The method for monitoring and controlling an access control system (12) according to claim 1, further comprising transmitting the control commands from the data goggles, via either a Bluetooth module (2) of the data goggles (1) or WLAN, to the at least one of the at least one server (16) and the at least one access control device (22) of the access control system (12).

3. The method for monitoring and controlling an access control system (12) according to claim 1, further comprising either initiating the control of the access control system (12) by the user of the data goggles (1) or carrying out the control of the access control system as a response to notifications or requests of the at least one of the at least one server (16) and the at least one access control device (22) of the access control system (12) which are displayed to the user via the display device (10) of the data goggles (1), when the access control system (12) transmits notifications via the at least one server (16) to the data goggles (1), directly displaying to the user the notifications, which require an action by the user, and the available control commands.

4. The method for monitoring and controlling an access control system (12) according to claim 1, further comprising informing the user of the data goggles, via the display device (10) of the data goggles (1), whether problems have occurred during detection of one of a Bluetooth low energy, an RFID, a barcode and another access authorization via the at least one access control device (22) of the access control system.

5. The method for monitoring and controlling an access control system (12) according to claim 4, further comprising in an event of an invalid access authorization, the user of the data goggles (1) can at least one of manually grant the person access to the controlled area, view a profile of the person associated with the respective access authorization, observe a live image of the person via a camera associated with the access control device (22) and the display device (10) of the data goggles (1), and give instructions to the person who possesses the access authorization via the microphone (8) of the data goggles (1) and a loudspeaker device of the access control device (22).

6. The method for monitoring and controlling an access control system (12) according to claim 1, further comprising carrying out an access control with the data goggles (1) by:
   either reading out, with the camera integrated in the data goggles (1), access authorizations comprising a barcode or reading out, via one of a Bluetooth low-energy module integrated in the data goggles (1), an HF reading device, an UHF reading device, and an RFID reading device integrated in the data goggles (1), access authorizations based on either Bluetooth low energy (BLE) or RFID standards;
   evaluating validity of the access authorizations in the data goggles (1) by means of barcode reading software or software for evaluating RFID or Bluetooth low energy (BLE) access authorizations and a positive/negative list or whitelist stored in a storage medium (14) of the data goggles (1) which is updated by the at least one server (16) at regular intervals or by a corresponding control by the user, or wherein the recording of the barcode or the read-out information of the RFID or Bluetooth low-energy (BLE) access authorizations are transmitted to the at least one server (16); and
   either allowing or refusing access of the person to the controlled area based on the evaluation made in the data goggles (1) or in the server (16) with regard to the validity of the access authorization.

7. The method for monitoring and controlling an access control system (12) according to claim 6, further comprising carrying out a face recognition via the camera (7) integrated in the data goggles (1), by:
   identifying the presence of the person in an acquisition field of the camera (7),
   recording an image of the face of the person,
   if face recognition software is installed in the data goggles (1), the face recognition is performed by means of the face recognition software installed in the data goggles (1) or if no face recognition software is installed in the data goggles (1), the recorded image is transmitted to the at least one server (16) for the face recognition,
   comparing the recorded image of the face of the person with a facial image associated with the access authorization, which serves as a reference image, and
   allowing access of the person to the controlled area when the reference image agrees with the recorded image of the face of the person and a valid access authorization is present.

8. The method for monitoring and controlling an access control system (12) according to claim 1, further comprising in a case of access control by means of a camera associated with the respective access control device (22) of the access control system (12),
   preparing facial views of the person whose access authorization is to be evaluated,
   transmitting the prepared facial views to the data goggles (1),
   displaying the prepared facial views at the same time with a facial image serving as reference image, associated with a recorded ID of the access authorization, by means of the display device (10) of the data goggles (1), and
   the user of the data goggles (1) allowing access if the reference image agrees with the recorded image of the person and a valid access authorization is present.

9. An apparatus for carrying out the method according to claim 1, wherein the apparatus is designed as data goggles (1) comprising a processor (13), storage means (14), a Bluetooth module (2), a digital camera (7), a microphone (8), a loudspeaker (9) a display device (10) and a WLAN module (6), wherein at least one of a Bluetooth low energy module for reading out access authorizations based on Bluetooth low energy standards and an HF reading device, a UHF reading device or an RFID reading device is integrated in the data goggles (1).

10. The apparatus according to claim 9, further comprising a remote control by which commands for selecting the views in the display device (10) of the data goggles (1) and the control commands can be input to the at least one of the at least one server (16) and the at least one access control device (22) which is worn like a watch on a wrist of the user of the data goggles (1) and is connected wirelessly to the data goggles (1).

* * * * *